(12) United States Patent
Kowalewski

(10) Patent No.: US 9,088,579 B2
(45) Date of Patent: Jul. 21, 2015

(54) COMMUNICATION DEVICE AND METHOD FOR GENERATING A MESSAGE

(75) Inventor: Frank Kowalewski, Goettingen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 581 days.

(21) Appl. No.: 13/169,135

(22) Filed: Jun. 27, 2011

(65) Prior Publication Data

US 2012/0331068 A1 Dec. 27, 2012

(51) Int. Cl.
| | |
|---|---|
| G06F 15/16 | (2006.01) |
| H04L 29/06 | (2006.01) |
| H04L 12/66 | (2006.01) |
| H04L 12/58 | (2006.01) |

(52) U.S. Cl.
CPC ............ *H04L 65/1006* (2013.01); *H04L 69/08* (2013.01); *H04L 12/66* (2013.01); *H04L 51/06* (2013.01)

(58) Field of Classification Search
CPC .......... H04L 51/06; H04L 69/08; H04L 12/66
USPC ........................................................ 709/227
See application file for complete search history.

(56) References Cited

U.S. PATENT DOCUMENTS

| | | | |
|---|---|---|---|
| 2003/0026289 A1* | 2/2003 | Mukherjee et al. ............ | 370/466 |
| 2008/0186921 A1* | 8/2008 | Long et al. ..................... | 370/331 |
| 2009/0257418 A1* | 10/2009 | Allen et al. .................... | 370/338 |
| 2011/0202661 A1* | 8/2011 | Sener ............................. | 709/227 |
| 2012/0020252 A1* | 1/2012 | Bouthemy .................... | 370/259 |
| 2012/0176964 A1* | 7/2012 | Cai et al. ....................... | 370/328 |

FOREIGN PATENT DOCUMENTS

| | | |
|---|---|---|
| EP | 1523142 A1 | 4/2005 |
| GB | 2384647 A | 7/2003 |

OTHER PUBLICATIONS

Kim et al, Emergency Text Messaging using SIP Message, Internet Engineering Task Force; Apr. 4, 2011, 11 pages.
3GPP TS 22.090 V9.0.0 (Dec. 2009) 3rd Generation Partnership Project; Technical Specification Group Services and System Aspects; Unstructured Supplementary Service Data (USSD)—Stage 1 (Release 9) pp. 1-10.
3GPP TS 24.080 V9.2.0 (Jun. 2010) 3rd Generation Partnership Project; Technical Specification Group Core Network and Terminals; Mobile radio interface layer 3 supplementary services specification; Formats and coding (Release 9); pp. 1-44.
3GPP TS 24.090 V10.0.0 (Mar. 2011) 3rd Generation Partnership Project; Technical Specification Group Core Network and Terminals; Unstructured Supplementary Service Data (USSD); Stage 3 (Release 10); pp. 1-13.
Network Working Group Request for Comments: 3261 "SIP: Session Initiation Protocol" J. Rosenberg et al. pp. 1-270.
Network Working Group Request for Comments: 3265 "Session Initiation Protocol (SIP)—Specific Event Notification" A. B. Roach pp. 1-39.
Network Working Group Request for Comments: 3428 "Session Initiation Protocol (SIP) Extension for Instant Messaging" Campbell et al. pp. 1-19.
European Patent Office; International Search Report and Written Opinion dated Nov. 13, 2012 for PCT App. No. PCT/EP2012/061595; 8 pages.
International Bureau of WIPO; International Preliminary Report on Patentability dated Jan. 16, 2014 for PCT App. No. PCT/EP2012/061595; 5 pages.

* cited by examiner

*Primary Examiner* — Shirley Zhang
(74) *Attorney, Agent, or Firm* — Schwabe, Williamson & Wyatt, P.C.

(57) ABSTRACT

According to one embodiment, a communication device is described that comprises a determining circuit configured to determine a type of an information indicated by a first message, wherein the first message is formed in accordance with a first transmission protocol; a selecting circuit configured to select a type of message according to a second transmission protocol based on the determined type of information; and a message generating circuit configured to generate a second message of the selected type according to the second transmission protocol indicating the information.

23 Claims, 7 Drawing Sheets

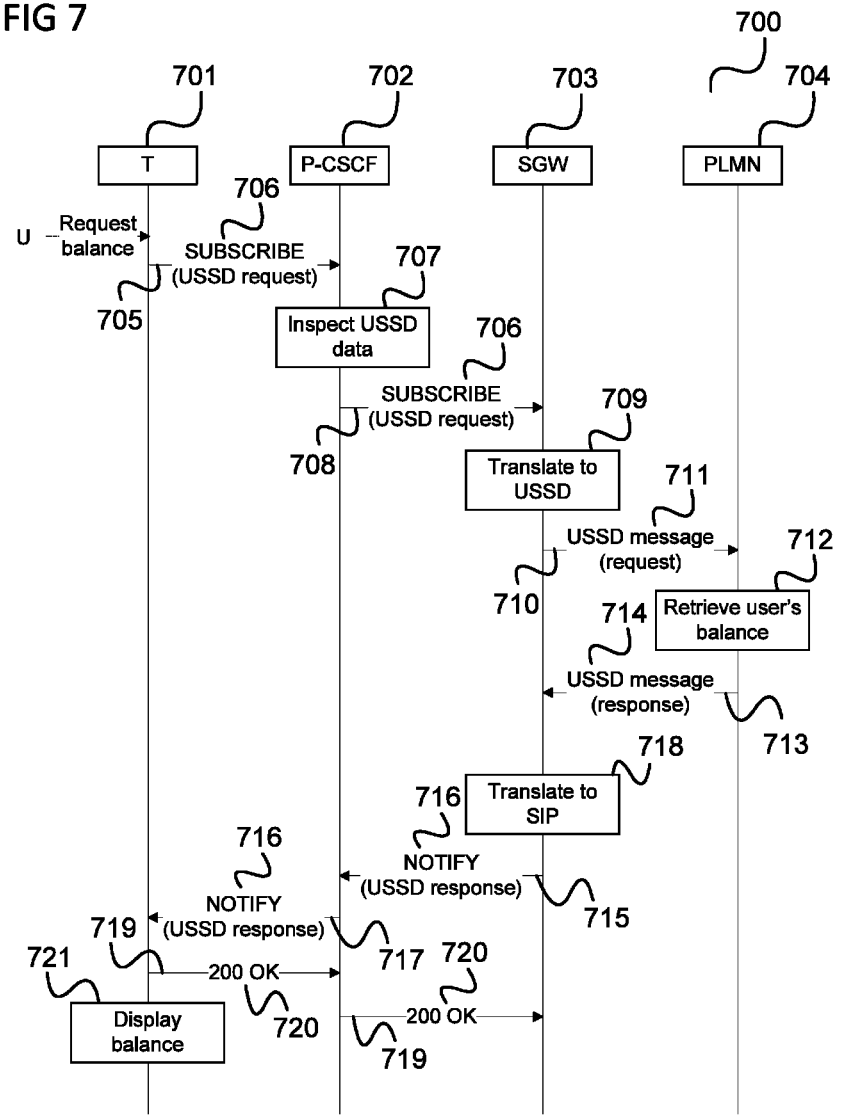

COMMUNICATION DEVICE AND METHOD FOR GENERATING A MESSAGE

TECHNICAL FIELD

Embodiments generally relate to a communication device and a method for generating a message.

BACKGROUND

Unstructured Supplementary Service Data (USSD) is a protocol that may be used by cellular telephones to communicate with a component of the network side. The efficient transmission of supplementary service data in accordance with USSD is desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 7 shows a flow diagram according to an embodiment.

DESCRIPTION

Figure 1:
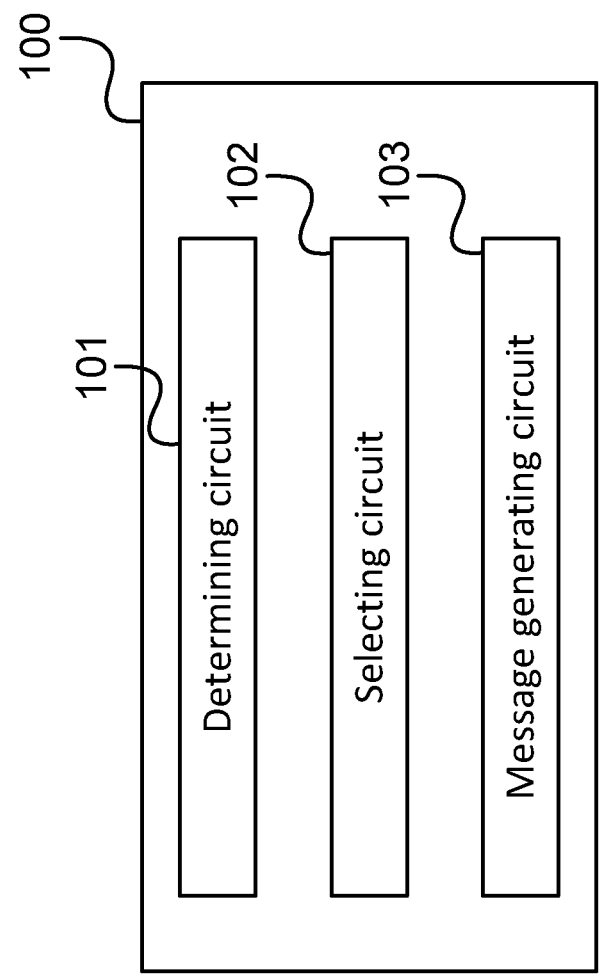
FIG. 1 shows a communication device according to an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Unstructured supplementary service data is a transmission protocol that allows the exchange of data between a communication terminal of a communication system and a component of the network side of the communication system, e.g. a radio access network and/or a core network of a cellular mobile communication system wherein the communication terminal is a subscriber terminal of the cellular mobile communication system.

In USSD Man Machine Interface mode (MMI mode) data may be transmitted that can be used to exchange generic information between a communication terminal and a component of the network side. For example, a communication terminal may transmit data according to USSD to request special information from the component of the network side and the component of the network side may transmit information data to be displayed by the communication terminal.

In USSD application mode data may be transmitted that can be used to exchange application specific information between a communication terminal and a component of the network side. For example, information may be exchanged for controlling a network based voice mail box for the communication terminal.

A USSD message can contain up to 182 7 bit characters.

In a mobile communication system according to 3GPP ($3^{rd}$ Generation Partnership Project) USSD data (i.e. USSD messages) may be transported via layer 3 signaling. According to USSD, data are exchanged in (small) dialogs referred to as transactions. Such a dialog is identified by a transaction identifiers (id). According to USSD, data are immediately transmitted (without store and forward).

According to one embodiment, a possibility is provided to transport USSD messages in a communication network that is not necessarily based on a 3GPP communication network. For example, according to one embodiment, a transport mechanism is provided that is applicable to an IMS (Internet Protocol Multimedia Subsystem) that is not necessarily provided with a 3GPP communication network. According to one embodiment, a possibility for immediate transport of USSD messages is provided. Further, according to one embodiment, a possibility for efficient transport (e.g. with low signaling overhead) is provided. According to one embodiment, a transport mechanism is provided that is compliant with IETF (Internet Engineering Task Force).

According to one embodiment, information indicated by a USSD message is transported (i.e. transmitted) by a SIP (Session Initiation Protocol) message. In other words, according to one embodiment, USSD is provided based on the SIP such that USSD messages can be transported in a SIP based communication system (like the IMS).

The SIP is a protocol that can be used for setting up and controlling multimedia sessions. It can be seen as a call control protocol.

A SIP SUBSCRIBE message can be used for subscribing to state information of the recipient of the SIP SUBSCRIBE message, i.e. to subscribe to being informed about the recipient's state information. A SIP NOTIFY message can be used to notify state information.

A SIP MESSAGE message can be used for transmitting a short message (e.g. a text based message) between SIP end points (i.e. communication devices communicating via SIP). A SIP MESSAGE message may be used for a standalone message or small messaging dialogs (this can be seen as pager style messaging). A SIP MESSAGE message may be sent inside or outside of a SIP dialog. If sent inside of a dialog the dialog must not be set up for solely transmitting SIP MESSAGE messages. The IP multimedia subsystem (IMS) provides communication services based on SIP.

According to one embodiment, SIP based communication systems (like the IMS) can be used to transport USSD messages. Thus, according to one embodiment, supplementary services to be used in SIP based communication systems can be based on USSD and existing USSD based supplementary services can be used in SIP based communication systems. According to one embodiment USSD messages can be immediately transmitted via SIP and can be transmitted efficiently (e.g. with low signaling overhead). Further, according to one embodiment, USSD message transport via SIP is compliant with the IETF specifications. According to one embodiment, USSD messages are transported using existing SIP messages such that no new SIP messages need to be specified.

Generally, according to one embodiment, a message according to a first transmission protocol (e.g. USSD) may be transmitted by a communication device by means of a message according to a second transmission protocol (e.g. SIP) in a way that may allow efficient transmission of the message according to the first transmission protocol. A communication device according to an embodiment is described in the following with reference to FIG. 1.

FIG. 1 shows a communication device 100 according to an embodiment.

The communication device 100 includes a determining circuit 101 configured to determine a type of an information indicated by a first message, wherein the first message is formed in accordance with a first transmission protocol.

The communication device 100 further includes a selecting circuit 102 configured to select a type of message according to a second transmission protocol based on the determined type of information and a message generating circuit 103 configured to generate a second message of the selected type according to the second transmission protocol indicating the information.

According to one embodiment, in other words, a message according to a first protocol is translated into a message according to a second protocol, wherein the type of message of the second protocol that is used depends on the type of information indicated by the first message. In other words, different types of messages of the second protocol are used for transporting different types of information indicated by messages according to the first protocol.

It should be noted that the first message does not necessarily need to be present in the communication device 100 (i.e. does not necessarily have to be generated by the communication device 100 or have been received by the communication device 100). In other words, the second message may be generated for a content, structure and/or type of the first message that it would have if the first transmission protocol was used for transmission of the information.

The first transmission protocol and/or the second transmission protocols are for example application layer protocols, i.e. protocols of the OSI (Open Systems Interconnection) reference model application layer.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The communication device according to an embodiments as described above with reference to FIG. 1 may further include a transmitter configured to send the generated message.

According to one embodiment, the information is included in the first message.

According to one embodiment, the message generating circuit is configured to generate the second message to include the information.

According to one embodiment, at least a part of the information is indicated by the type of the second message. For example, if the type of the second message is an error message, the second message indicates as the information that an error has occurred and/or that a request is rejected.

According to one embodiment, the second protocol is a call control protocol, for example the Session Initiation Protocol.

According to one embodiment, the type of information is one of information indicating a request, information indicating a positive response to a request (e.g. indicates a result such as requested data or an acknowledgement), and information indicating a negative response to a request (e.g. indicates that an error has occurred or that the request is denied).

According to one embodiment, the type of information is at least one of information for indicating that a service is requested, information for indicating that data is requested, requested data, information for signaling a rejection of a request, information for acknowledging a request, information for indicating an error with respect to a request, and information for indicating that a message transaction is completed.

According to one embodiment, the type of information is the type of an information element of the first message. In case of USSD, the type of information is for example whether the message includes a Facility information element (i.e. a Facility information element type or a non-Facility information element type). In case of USSD the type of information may also be for example a type of component in a Facility information element, e.g. Invoke, Return result, Return error or Reject.

According to one embodiment, the type of information corresponds to a type of message according to the first transmission protocol.

According to one embodiment, the first protocol is the Unstructured Supplementary Service Data (USSD) protocol.

The communication device is for example a communication terminal. For example, it operates as a an Internet Protocol Subsystem (IMS) client.

The communication device may also be a communication server on the network side of a communication system (e.g. of a radio access network or a core network of a communication system). For example, the communication device operates as an Internet Protocol Multimedia Subsystem (IMS) server or as a gateway between an Internet Protocol Multimedia Subsystem and another communication network (e.g. a non-IMS communication network).

Figure 2:
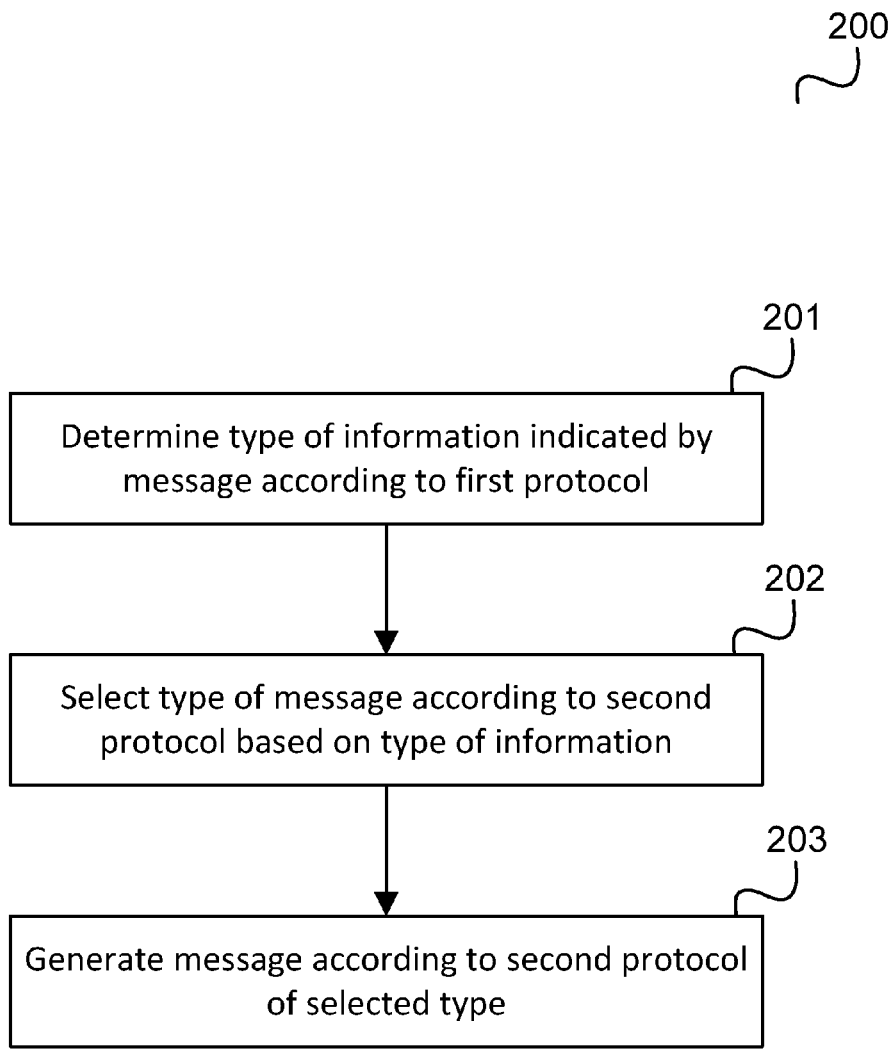
FIG. 2 shows a flow diagram according to an embodiment.

The communication device 100 for example carries out a method as illustrated in FIG. 2.

FIG. 2 shows a flow diagram 200 according to an embodiment.

The flow diagram 200 illustrates a method for generating a message.

In 201, a type of an information indicated by a first message is determined, wherein the first message is formed in accordance with a first transmission protocol.

In 202, a type of message according to a second transmission protocol is selected based on the determined type of information.

In 203, a second message of the selected type is generated according to the second transmission protocol indicating the information.

It should be noted that embodiments described in context of the communication device are analogously valid for the method for generating a message and vice versa.

According to one embodiment, the first transmission protocol is USSD and the second transmission protocol is SIP. Thus, according to one embodiment, SIP messages are used for transporting USSD data (i.e. USSD messages) in a SIP communication system. For this, according to one embodiment, the SIP messages specify an event package 'ussd' and a Content-Type 'application/ussd' to indicate that they contain USSD data.

According to one embodiment, different types of SIP messages are used for transporting different types of information indicated by USSD messages. In other words, USSD messages indicating different types of information are according to one embodiment translated to different SIP messages. For example, according to one embodiment, different kinds of SIP messages are used for transporting USSD response messages depending on the type of the USSD responses (e.g. whether a request is rejected or accepted, whether there is an error, etc.). Further, for example, a SIP request message is used for transporting a USSD request message and a USSD non-error response and a SIP error response message is used for transporting a USSD error response message.

As further examples, according to various embodiments, USSD REGISTER messages may be translated to SIP SUBSCRIBE messages; USSD FACILITY messages may be translated to SIP SUBSCRIBE and SIP NOTIFY messages; USSD RELEASE COMPLETE messages may be translated to SIP SUBSCRIBE and SIP NOTIFY messages; USSD success response messages may be translated to SIP NOTIFY and SIP 200 OK messages and USSD error response messages may be translated to SIP error response messages. USSD transaction ids may for example be translated to the 'id' parameter in SIP event header fields.

Alternatively, according to various embodiments, USSD REGISTER messages, USSD FACILITY messages and USSD RELEASE COMPLETE messages may be translated to SIP MESSAGE messages. In this case, for example, USSD success response messages are translated to SIP MESSAGE messages and USSD error response messages are translated to SIP error response messages. USSD transaction ids may for example be specified in the SIP messages' bodies in this case.

According to one embodiment, for interworking with a non-SIP based USSD supporting communication system a gateway may perform a translation between USSD messages and SIP messages. In other words, the communication device 100 described above with reference to FIG. 1 may work as a gateway between a first communication system using the first protocol and a second communication system using the second protocol.

According to one embodiment, for interworking with USSD based applications IMS clients (e.g. running on communication terminals) and IMS servers translate between USSD messages and SIP messages. In other words, the communication device 100 described above with reference to FIG. 1 may operate as an IMS client or an IMS server.

In the following, examples are given for transporting USSD message information by means of SIP.

Figure 3:
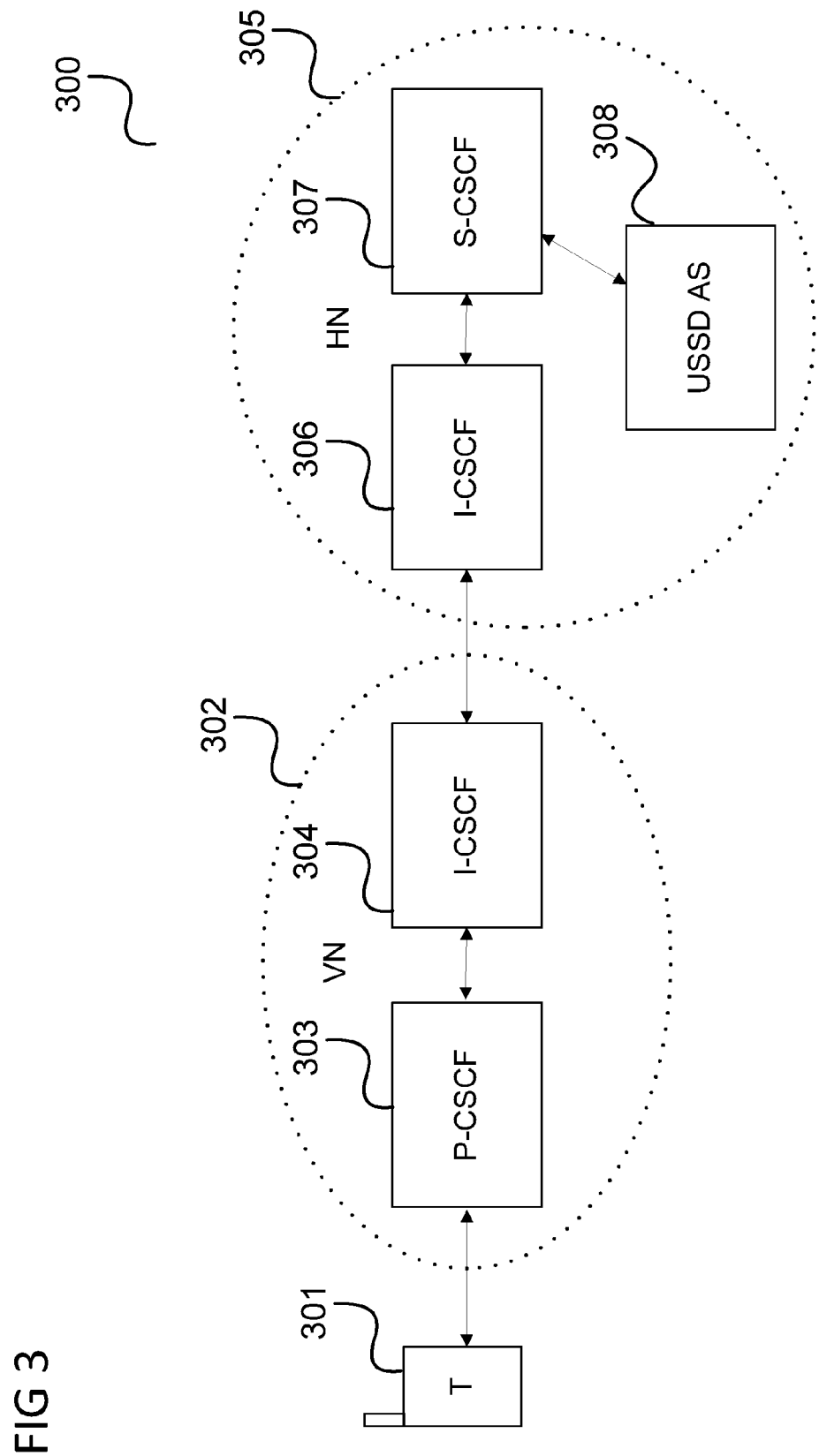
FIG. 3 shows a communication system according to an embodiment.

FIG. 3 shows a communication system 300 according to an embodiment.

The communication system 300 is an IMS communication system, i.e. a communication system based on IMS. It includes a communication terminal 301, in other words an end device, for example a mobile terminal, and a visited (IMS) network 302, i.e. an IMS network which is not operated by the operator of the home network of the communication terminal 301. The visited network 302 includes a P-CSCF (Proxy—Call Session Control Function 303) and a first I-CSCF 304 (Interrogating—CSCF).

The communication system 300 further includes a home (IMS) network 305 of the communication terminal 301 which includes a second I-CSCF 306, an S-CSCF (Serving—CSCF) 307 and a USSD AS (USSD Application Server) 308.

The communication terminal 301 is connected to the visited network's Proxy-CSCF (P-CSCF) 303. The P-CSCF 303 is connected to the home operator's Serving CSCF (S-CSCF) 307 via the first I-CSCF 304 and the second I-CSCF 306. The S-CSCF 307 is connected to the home operator's USSD application server 308.

In the following example, it is assumed that the user of the communication terminal 301 would like to enable call forwarding for his communication terminal 301. The corresponding signaling flow is illustrated in FIG. 4.

Figure 4:
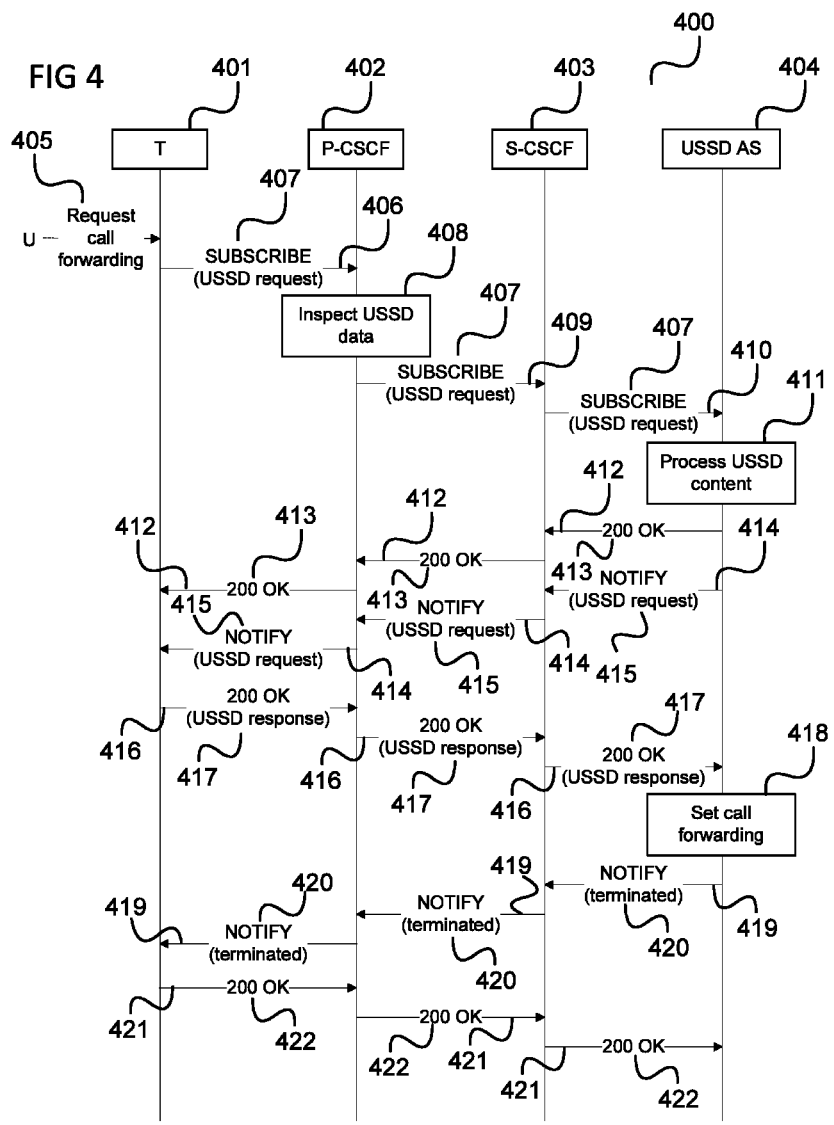
FIG. 4 shows a flow diagram according to an embodiment.

FIG. 4 shows a flow diagram 400 according to an embodiment,

The flow takes place between a communication terminal 401 corresponding to the communication terminal 301, a P-CSCF 402 corresponding to the P-CSCF 303, an S-CSCF 403 corresponding to the S-CSCF 307, and a USSD AS 404 corresponding to the USSD AS 308.

In 405, the user initiates the generation and sending of a USSD message using the communication terminal 401 to request call forwarding. The generated USSD message includes particular USSD codes indicating that the USSD message should be sent to the user's home network and indicating that call forwarding is requested.

In 406, the communication device 401 translates the USSD message into a SIP SUBSCRIBE message 407. The SIP SUBSCRIBE message 407 includes an event header specifying the 'ussd' event package and the USSD transaction identifier (id) as an 'Id' parameter. It also includes an 'application/ussd' Content-Type body including the USSD data, i.e. the contents of the USSD message.

The USSD message generated by the communication device 401 and the corresponding SIP SUBSCRIBE message 407 for example have the following structure:

| USSD message: | |
| --- | --- |
| Transaction identifier: | 1234 |
| Message type: | Register |
| Facility: | Invoke = ProcessUnstructuredSS-Request, ussd-String = *12(5)#SEND |

| SIP message: |
| --- |
| SUBSCRIBE sip:ims@operator.com SIP/2.0<br>Via: SIP/2.0/TCP watcherhost.example.com;branch=z9hG4bKnashds7<br>To: <sip:ims@operator.com><br>From: <sip:user@example.com>;tag=xfg9<br>Call-ID: 2010@watcherhost.example.com<br>CSeq: 17766 SUBSCRIBE<br>Max-Forwards: 70<br>Event: ussd;id=1234<br>Accept: application/ussd<br>Contact: <sip:user@watcherhost.example.com><br>Expires: 600<br>Content-Type: application/ussd<br>Content-Length: 88<br>MessageType:Register<br>Facility:Invoke = ProcessUnstructuredSS-Request, ussd-String = *12(5)#SEND |

After the generation of the SIP SUBSCRIBE message 407, the communication device 401 sends the SIP SUBSCRIBE message 407 to the (visited) P-CSCF 402.

In 408, when the P-CSCF 402 receives the SIP SUBSCRIBE message 407 it determines from the Content-Type header field of the SIP SUBSCRIBE message 407 that the content of the SIP SUBSCRIBE message 407 is to be treated as USSD data. Therefore, the P-CSCF 402 inspects the content of the SIP SUBSCRIBE message 407 for USSD codes and forwards, in 409, the SIP SUBSCRIBE message 407 to the home network (specifically to the S-CSCF 403) since it includes the USSD code for home network forwarding. The SIP SUBSCRIBE message 407 is being forwarded via the first (visited) I-CSCF 304 and the second (home) I-CSCF 306 to the (home) S-CSCF 403.

In 410, the S-CSCF 403 finds from the Content-Type header field of the SIP SUBSCRIBE message 407 that the content of the SIP SUBSCRIBE message 407 is to be treated as USSD data and forwards the SIP SUBSCRIBE message 407 to the USSD AS 404.

In 411, the USSD AS 404 inspects the content of the SIP SUBSCRIBE message 407 for USSD codes. It finds the USSD service code for call forwarding.

Further, the USSD AS 404 finds that no destination for call forwarding has been defined yet by the user. Therefore, it generates a USSD message to request the call forwarding destination from the end device and translates the USSD message to a first SIP NOTIFY message 415.

The USSD message generated by the USSD AS 404 and the corresponding first SIP NOTIFY message 415 for example have the following structures:

| USSD message: | |
|---|---|
| Transaction identifier: | 1234 |
| Message type: | Facility |
| Facility: | Invoke = UnstructuredSS-Request, ussd-String = *13(7)#SEND |

| SIP message: |
|---|
| NOTIFY sip:user@watcherhost.example.com SIP/2.0<br>Via: SIP/2.0/TCP server.example.com;branch=z9hG4bKna998sk<br>From: <sip:ims@operator.com>;tag=ffd2<br>To: <sip:user@example.com>;tag=xfg9<br>Call-ID: 2010@watcherhost.example.com<br>Event: ussd;id=1234<br>Subscription-State: active;expires=599<br>Max-Forwards: 70<br>CSeq: 8775 NOTIFY<br>Contact: sip:server.example.com<br>Content-Type: application/ussd<br>Content-Length: 57<br>MessageType:Facility<br>Facility:Invoke = UnstructuredSS-Request, ussd-String = *13(7)#SEND |

In 412, the USSD AS 404 responds by means of a first SIP 200 OK message 413 to acknowledge the reception of the SIP SUBSCRIBE message 407 and sends, in 414, the first SIP NOTIFY message 415 to the communication device terminal 401.

The first SIP NOTIFY message 415 is sent via the (home) S-CSCF 403 and the second I-CSCF 306 and the first I-CSCF 304 to the P-CSCF 303 and from there to the communication terminal 401.

When receiving the first SIP NOTIFY message 415 the communication device 401 determines from the Content-Type header field of the first SIP NOTIFY message 415 that the content of the first SIP NOTIFY message 415 is to be treated as USSD data and inspects the message's content for USSD codes. It finds the code for requesting the call forwarding destination and, in 416, sends back a second SIP 200 OK message 417 including a USSD body containing a USSD code corresponding to a further USSD message for call forwarding destination and the destination URL (Uniform Resource Locator).

The further USSD message and the second SIP 200 OK message 417 for example have the following structures:

| USSD message: | |
|---|---|
| Transaction identifier: | 1234 |
| Message type: | Facility |
| Facility: | Return result = UnstructuredSS-Request, ussd-String = *17(9)*tel:+1-201-555-0123#SEND |

| SIP message: |
|---|
| SIP/2.0 200 OK<br>Via: SIP/2.0/TCP server.example.com;branch=z9hG4bKna998sk<br>;received=192.0.2.2<br>From: <sip:ims@operator.com>;tag=ffd2<br>To: <sip:user@example.com>;tag=xfg9<br>Call-ID: 2010@watcherhost.example.com<br>CSeq: 8775 NOTIFY<br>Accept: application/ussd<br>Content-Type: application/ussd<br>Content-Length: 47<br>MessageType:Facility<br>Facility:Return result = UnstructuredSS-Request, ussd-String = *17(9)*tel:+1-201-555-0123#SEND |

In 418, when receiving the second SIP 200 OK message 417 the USSD AS 404 sets the call forwarding destination for the user to the URL provided by the second SIP 200 OK message 417 and enables call forwarding.

After the transaction has been completed the USSD AS 404 releases the transaction by generating a USSD RELEASE COMPLETE message and translating the message to a second SIP NOTIFY message 420 in 418 with a Subscription-State value of 'terminated'. In 419 the USSD AS 404 then sends the second SIP NOTIFY message 420 to the communication device 401.

The USSD RELEASE COMPLETE message and the second SIP NOTIFY message 420 for example have the following structures:

| USSD message: | |
|---|---|
| Transaction identifier: | 1234 |
| Message type: | Release Complete |
| Facility: | Return result = ProcessUnstructuredSS-Request, ussd-String = |

| SIP message: |
|---|
| NOTIFY sip:user@watcherhost.example.com SIP/2.0<br>Via: SIP/2.0/TCP server.example.com;branch=z9hG4bKna998sk<br>From: <sip:ims@operator.com>;tag=ffd2<br>To: <sip:user@example.com>;tag=xfg9<br>Call-ID: 2010@watcherhost.example.com<br>Event: ussd;id=1234<br>Subscription-State: terminated<br>Max-Forwards: 70<br>CSeq: 8776 NOTIFY<br>Contact: sip:server.example.com<br>Content-Type: application/ussd<br>Content-Length: 74<br>MessageType:Release Complete<br>Facility:Return result = ProcessUnstructuredSS-Request, ussd-String = |

In 421, the communication device 401 acknowledges receipt of the second SIP NOTIFY message 420 by means of a third 200 OK message 422.

According to another embodiment, other USSD messages than the ones used in the flow illustrated in FIG. 4 may be exchanged. For example, the USSD messages given in the left column of table 1 may be used. For each USSD message a corresponding SIP message into which the USSD message may be translated according to one embodiment is given in the right hand column of table 1.

TABLE 1

| USSD message | SIP message |
| --- | --- |
| Facility (Invoke) | SUBSCRIBE |
| Facility (Return result) | NOTIFY if sent by notifier (i.e. network side component such as USSD AS); or 200 OK if sent by subscriber (i.e. communication terminal) |
| Facility (Return error) | 403 |
| Facility (Reject) | 603 |
| RELEASE COMPLETE | SUBSCRIBE with Expires header set to 0 if sent by subscriber; or NOTIFY with Subscription-State value of 'terminated' if sent by notifier |

According to table 1, USSD error and rejection responses are not translated to SIP request messages, but to SIP error responses. Such a SIP error response, e.g. a SIP 603 message is for example sent if in 411, after the checking the USSD content of the SIP SUBSCRIBE message 407 an error occurs, e.g. in case call forwarding is not possible or, in case that instead of call forwarding retrieval of the user's current balance (e.g. prepaid account balance) is requested, if the retrieval of the user's balance fails. In this case, the USSD AS 404 may for example respond with a SIP 603 message which is followed by the transmission of the second SIP NOTIFY message 420 indicating termination of the transaction.

The example described above with reference to FIG. 4 may be seen as an example for an end device initiated USSD transaction via IMS.

In the following, a further example is given based on the communication system 300 illustrated in FIG. 3.

In this example, it is assumed that the network provider of the user of the communication terminal 301, i.e. the operator of the home network 305 of the user, would like to know the amount of free memory still available on the user's SIM (Subscriber Identity Module) card installed in the communication device 301.

Figure 5:
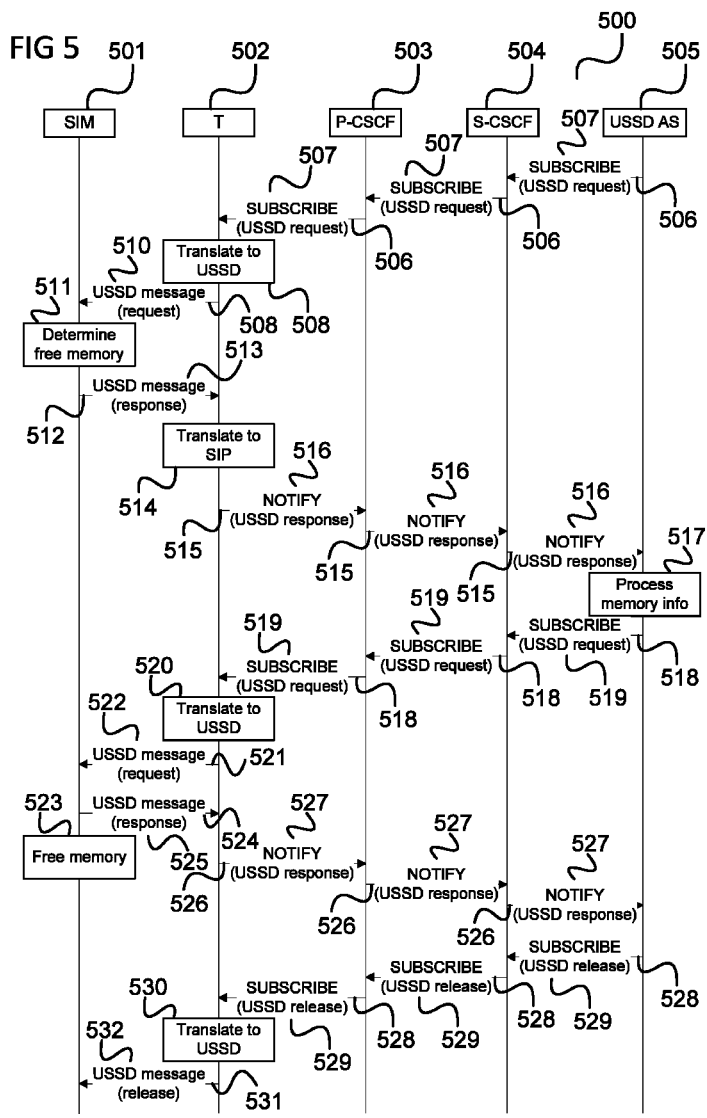
FIG. 5 shows a flow diagram according to an embodiment.

The corresponding message flow is illustrated in FIG. 5.

FIG. 5 shows a flow diagram 500 according to an embodiment.

The flow takes place between a SIM card 501, a communication terminal 502 (in which the SIM card 501 is installed) corresponding to the communication terminal 301, a P-CSCF 503 corresponding to the P-CSCF 303, an S-CSCF 504 corresponding to the S-CSCF 307, and a USSD AS 505 corresponding to the USSD AS 308, In 506, the network provider's USSD application server 505 generates a USSD message directed to the communication terminal 502 for querying the free memory amount of the SIM card 501. The USSD message includes particular USSD codes indicating that the USSD message should be sent to the user's SIM card 501 and indicating that the amount of free SIM card memory is requested.

The USSD AS 505 translates the USSD message into a first SIP SUBSCRIBE message 507. The first SIP SUBSCRIBE message 507 includes an Event header specifying the 'ussd' event package and the USSD transaction identifier (id) as an 'id' parameter. It also includes an 'application/ussd' Content-Type body including the USSD data (i.e. the content of the USSD message).

The USSD message and the corresponding first SIP SUBSCRIBE message 507 have for example the following structures:

| USSD message: | |
| --- | --- |
| Transaction identifier: | 1234 |
| Message type: | Register |
| Facility: | Invoke = ProcessUnstructuredSS-Request, ussd-String = *13(6)#SEND |

SIP message:

SUBSCRIBE sip:ims@operator.com SIP/2.0
Via: SIP/2.0/TCP watcherhost.example.com;branch=z9hG4bKnashds7
To: <sip:ims@operator.com>
From: <sip:user@example.com>;tag=xfg9
Call-ID: 2010@watcherhost.example.com
CSeq: 17766 SUBSCRIBE
Max-Forwards: 70
Event: ussd;id=1234
Accept: application/ussd
Contact: <sip:user@watcherhost.example.com>
Expires: 600
Content-Type: application/ussd
Content-Length: 88
MessageType:Register
Facility:Invoke = ProcessUnstructuredSS-Request, ussd-String = *13(6)#SEND The USSD AS 505 sends in 506 the first SIP SUBSCRIBE message 507 via the S-CSCF 504 and the second I-CSCF 306 and the first I-CSCF 304 to the P-CSCF 503 and from there to communication terminal 502.

In 508, when the communication terminal 502 receives the first SIP SUBSCRIBE message 507 it knows from the Content-Type header field of the first SIP SUBSCRIBE message 507 that the content of the first SIP SUBSCRIBE message 507 is to be treated as USSD data. Therefore, the communication terminal 502 inspects the message content for USSD codes and translates the first SIP SUBSCRIBE message 507 into a first USSD message 510. In 509, the communication terminal 502 forwards the first USSD message 510 to the SIM 501 since the SIP SUBSCRIBE message 507 includes the USSD code for SIM forwarding.

In 511, the SIM 501 inspects the message's content for USSD codes. It finds the USSD service code for free memory amount querying and in 512 sends back a second USSD message 513 including the free amount of memory. The second USSD message 513 also includes a USSD code indicating that the second USSD message 513 should be forwarded to the user's home network 305.

In 514, when receiving the second USSD message 513 from the SIM 501, the communication terminal 502 translates it to a first SIP NOTIFY message 516 and sends the first SIP NOTIFY message 516 to the user's home network 305 in 515.

It should be noted that all SIP SUBSCRIBE messages and SIP NOTIFY messages may be answered by means of a SIP 200 OK message. This is not shown in the flow for simplicity.

When receiving the first SIP NOTIFY message 516 the S-CSCF 504 knows from the Content-Type header field of the first SIP NOTIFY message 516 that the content of the first SIP NOTIFY message 516 is to be treated as USSD data and forwards it to the operator's USSD AS 505.

In this example, it is assumed in 517 that the USSD AS 505 extracts the free memory amount information from the first SIP NOTIFY message 516 and finds that the free memory amount is too low. Therefore the USSD AS 505 generates a further USSD message to request the user's SIM card to free unneeded memory. The USSD AS 505 translates the further USSD message to a second SIP SUBSCRIBE message 519. The second SIP SUBSCRIBE message 519 includes the same USSD transaction id as the first SIP SUBSCRIBE message 507 in the Event header as an 'id' parameter to indicate that the included USSD data (or USSD message) belongs to the same USSD transaction as the USSD data included in the first SIP SUBSCRIBE message 507.

In 518, the second SIP SUBSCRIBE message 519 is being forwarded to the communication terminal 502 via the S-CSCF 504, the second I-CSCF 306 and the first I-CSCF 304 and the P-CSCF 503.

In 520, the communication terminal 502 translates the second SIP SUBSCRIBE message 519 to a third USSD message 522 and forwards it to the SIM 501 in 521.

In 523, the SIM 501 finds the USSD code for freeing memory and frees unneeded memory.

Further, the SIM 501 may transmit a response similarly to 512 and 515 in 524 and 526 by means of a fourth USSD message 525 that is translated by the communication device 502 to a second SIP NOTIFY message 527.

In 528, after the transaction has been completed the USSD AS 505 releases the transaction by generating a USSD RELEASE COMPLETE message and translating it into a third SIP SUBSCRIBE message 529 with an Expires header value of 0 and by sending it to the SIM 501 in 528.

In 530, the third SIP SUBSCRIBE message 529 is translated to a fifth USSD message 532 which is sent to the SIM 501 in 531.

The USSD RELEASE COMPLETE message and the third SIP SUBSCRIBE message 529 for example have the following structures:

| USSD message: | |
|---|---|
| Transaction identifier: | 1234 |
| Message type: | Release Complete |
| Facility: | Return result = ProcessUnstructuredSS-Request, ussd-String = |

| SIP message: |
|---|
| SUBSCRIBE sip:ims@operator.com SIP/2.0<br>Via: SIP/2.0/TCP watcherhost.example.com;branch=z9hG4bKnashds7<br>To: <sip:ims@operator.com><br>From: <sip:user@example.com>;tag=xfg9<br>Call-ID: 2010@watcherhost.example.com<br>CSeq: 17766 SUBSCRIBE<br>Max-Forwards: 70<br>Event: ussd;id=1234<br>Accept: application/ussd<br>Contact: <sip:user@watcherhost.example.com><br>Expires: 0<br>Content-Type: application/ussd<br>Content-Length: 74<br>MessageType:Release Complete<br>Facility:Return result = ProcessUnstructuredSS-Request, ussd-String = |

The example described with reference to FIG. 5 can be seen as an example for a USSD transaction via IMS initiated by the network side.

A further example is described in the following. For this example, a communication system based on IMS as illustrated in FIG. 6 is assumed.

Figure 6:
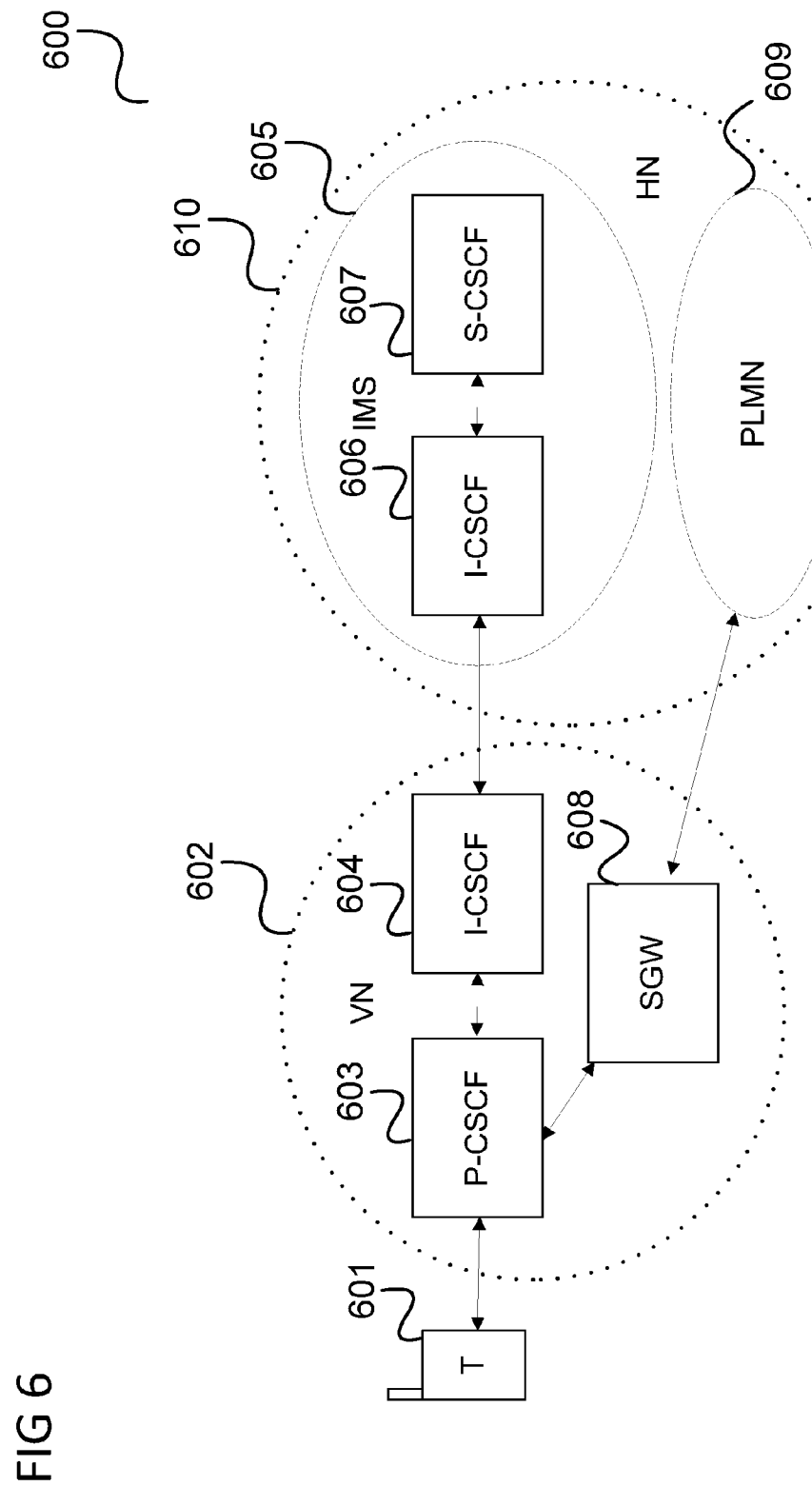
FIG. 6 shows a communication system according to an embodiment.

FIG. 6 shows a communication system 600 according to an embodiment.

The communication system 600 is an IMS communication system, i.e. a communication system based on IMS. It includes a communication terminal 601, in other words an end device, for example a mobile terminal, and a visited (IMS) network 602, i.e. an IMS network which is not operated by the operator of the home network of the communication terminal 601. The visited network 602 includes a P-CSCF (Proxy—Call Session Control Function 603), a first I-CSCF 604 (Interrogating—CSCF) and a signaling gateway (SGW) 608.

The communication system 600 further includes a home IMS network 605 of the communication terminal 601 which includes a second I-CSCF 606 and an S-CSCF (Serving—CSCF) 607. Further, the communication system 600 includes a PLMN (Public Land Mobile Network) 609. The PLMN 609 may be a home PLMN 609 of the communication terminal 601 such that the home IMS network 605 and the PLMN 609 can be seen to form a home network 610 of the communication terminal 601.

The communication terminal 601 is connected to the visited network's Proxy-CSCF (P-CSCF) 603. The P-CSCF 603 is connected to the home operator's Serving CSCF (S-CSCF) 607 via the first I-CSCF 604 and the second I-CSCF 606.

Unlike in the examples described with reference to FIG. 3, the P-CSCF 603 is also connected to the home operator's PLMN 609 via a Media Gateway Controller Function (MGCF) and the Signaling Gateway (SGW) 608. For brevity the MGCF and SGW 608 are subsumed in the following under the SGW 608.

It is assumed that the user of the communication terminal 601 is using the communication terminal 601 with a prepaid subscription. It is further assumed that he would like to know his subscription's current balance.

The corresponding message flow is illustrated in FIG. 7.

FIG. 7 shows a flow diagram 700 according to an embodiment.

The flow takes place between a communication terminal 701 corresponding to the communication terminal 601, a P-CSCF 702 corresponding to the P-CSCF 603, an SGW 703 corresponding to the SGW 608, and a PLMN 704 corresponding to the PLMN 609.

The user initiates the generation of a USSD message by his communication terminal 701 for querying the balance. The USSD message includes particular USSD codes indicating that the USSD message should be sent to the user's home network 610 and indicating that the current subscription balance is requested.

The communication device 701 translates the USSD message into a SIP SUBSCRIBE message 706. The SIP SUBSCRIBE message 706 includes an Event header specifying the 'ussd' event package and the USSD transaction identifier (id) as an 'id' parameter. It also includes an 'application/ussd' Content-Type body including the USSD data.

The USSD message and the SIP SUBSCRIBE message 706 for example have the following structures:

| USSD message: | |
|---|---|
| Transaction identifier: | 1234 |
| Message type: | Register |
| Facility: | Invoke = ProcessUnstructuredSS-Request, ussd-String = *12(5)#SEND |

| SIP message: |
|---|
| SUBSCRIBE sip:ims@operator.com SIP/2.0<br>Via: SIP/2.0/TCP watcherhost.example.com;branch=z9hG4bKnashds7<br>To: <sip:ims@operator.com><br>From: <sip:user@example.com>;tag=xfg9<br>Call-ID: 2010@watcherhost.example.com<br>CSeq: 17766 SUBSCRIBE<br>Max-Forwards: 70<br>Event: ussd;id=1234 |

-continued

```
Accept: application/ussd
Contact: <sip:user@watcherhost.example.com>
Expires: 600
Content-Type: application/ussd
Content-Length: 88
MessageType:Register
Facility:Invoke = ProcessUnstructuredSS-Request, ussd-String =
*12(5)#SEND
```

In 705, the communication terminal 701 sends the SIP SUBSCRIBE message 706 to the P-CSCF 702.

In 707, when the P-CSCF 702 receives the SIP SUBSCRIBE message 706 it knows from the Content-Type header field of the SIP SUBSCRIBE message 706 that the content of the SIP SUBSCRIBE message 706 is to be treated as USSD data. Therefore, the P-CSCF 702 inspects the content of the SIP SUBSCRIBE message 706 for US SD codes and realizes that the SIP SUBSCRIBE message 706 should be forwarded to the user's home network 610.

In this example, it is assumed that the home network 610 does not support USSD via IMS. Therefore, the P-CSCF 702 forwards the SIP SUBSCRIBE message 706 to the SGW 608 in 708. In 709, the SGW 703 translates the SIP SUBSCRIBE message 706 into a first USSD message 711 and forwards the first USSD message 711 to the home operator's PLMN 704 in 710.

In 712, the PLMN 704 finds the USSD service code for balance querying and responds in 713 with a second USSD message 714 including the current balance information. The second USSD message 714 includes a code indicating that the content of the second USSD message 714 should be presented to the user.

The second USSD message 714 is sent from the PLMN 704 to the SGW 703. In 718, the SGW 703 translates the received second USSD message 714 to a SIP NOTIFY message 716 and sends it in 715 to the P-CSCF 702 which forwards the SIP NOTIFY message 716 in 717 to the communication terminal 701.

The second USSD message and the SIP NOTIFY message 716 for example have the following structures:

| USSD message: | |
| --- | --- |
| Transaction identifier: | 1234 |
| Message type: | Facility |
| Facility: | Invoke = UnstructuredSS-Request, ussd-String = *13(7)#SEND |

| SIP message: |
| --- |

```
NOTIFY sip:user@watcherhost.example.com SIP/2.0
Via: SIP/2.0/TCP server.example.com;branch=z9hG4bKna998sk
From: <sip:ims@operator.com>;tag=ffd2
To: <sip:user@example.com>;tag=xfg9
Call-ID: 2010@watcherhost.example.com
Event: ussd;id=1234
Subscription-State: active;expires=599
Max-Forwards: 70
CSeq: 8775 NOTIFY
Contact: sip:server.example.com
Content-Type: application/ussd
Content-Length: 57
MessageType:Facility
Facility:Invoke = UnstructuredSS-Request, ussd-String =
*13(7)#SEND
```

When receiving the SIP NOTIFY message 716 the communication terminal 701 determines from the Content-Type header field of the SIP NOTIFY message 716 that the content of the SIP NOTIFY message 716 is to be treated as USSD data and inspects the content of the SIP NOTIFY message 716 for USSD codes. It finds the code for user presentation and displays the USSD message's content (the current balance information) for the user in 721. The communication terminal 701 further acknowledges in 719 receipt of the SIP NOTIFY message 716 by means of a 200 OK message 720.

It should be noted that in other embodiments, instead of indicating USSD data in a SIP message by the Content-Type header value 'application/ussd' the USSD data may be indicated by other Content-Type header values, e.g. by 'application/ussd+xml'.

Further, in various embodiments, instead of indicating USSD data in a SIP message by a Content-Type header value (like 'application/ussd') the USSD data may be indicated by a particular Content-Disposition header value, e.g. by 'ussd'. In this case the Content-Type header value may be set to 'text/plain'.

Additionally, in some embodiments, instead of using SIP SUBSCRIBE/NOTIFY messages for transporting USSD data, SIP MESSAGE messages may be used. In this case USSD messages are for example translated to SIP messages according to the table 2.

TABLE 2

| USSD message | SIP message |
| --- | --- |
| Facility (Invoke) | MESSAGE |
| Facility (Return result) | MESSAGE |
| Facility (Return error) | 403 |
| Facility (Reject) | 603 |
| RELEASE COMPLETE | MESSAGE |

For example, in the example described with reference to FIG. 4, SIP MESSAGE messages are used instead of the SIP SUBSCRIBE and SIP NOTIFY messages. Further, where in the flow described with reference to FIG. 4 the second SIP OK message 417 is used to carry USSD data, the second SIP OK message 417 is only used for acknowledging the first SIP NOTIFY message 415 and a SIP MESSAGE message is sent in addition to the second SIP OK message 417 from the communication terminal 401 to the USSD AS 404 to transmit the USSD data.

Further, according to one embodiment, instead of translating USSD error responses to SIP error responses, USSD error responses may be translated to SIP messages like SIP SUBSCRIBE/NOTIFY or SIP MESSAGE.

According to one embodiment, when using SIP SUBSCRIBE/NOTIFY messages USSD data may not be indicated by a particular Content-Type (like 'ussd'). In this case the Event header value 'ussd' may indicate that USSD data is included in the messages.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
    a determining circuit to determine a type of an information indicated by a first message, wherein the first message is formed in accordance with a first transmission protocol;

a selecting circuit to select a type of message from a plurality of existing types of messages according to a second transmission protocol based on the determined type of information; and a message generating circuit to generate a second message of the selected type according to the second transmission protocol indicating the information, wherein the second message includes an indicator of the first transmission protocol, and wherein the indicator of the first transmission protocol includes an event package indicator.

2. The communication device according to claim 1, further comprising a transmitter to send the generated message.

3. The communication device according to claim 1, wherein the second protocol is a call control protocol.

4. The communication device according to claim 1, where in the second protocol is the Session Initiation Protocol.

5. The communication device according to claim 1, wherein the type of information is one of information indicating a request, information indicating a positive response to a request, and information indicating a negative response to a request.

6. The communication device according to claim 1, wherein the type of information is at least one of information for indicating that a service is requested, information for indicating that data is requested, requested data, information for signaling a rejection of a request, information for acknowledging a request, information for indicating an error with respect to a request, and information for indicating that a message transaction is completed.

7. The communication device according to claim 1, wherein the first protocol is the Unstructured Supplementary Service Data protocol.

8. The communication device according to claim 1, being an end user mobile device.

9. The communication device according to claim 8, operating as an Internet Protocol Subsystem client.

10. The communication device according to claim 1, being a communication server on the network side of a communication system.

11. The communication device according to claim 10, operating as an Internet Protocol Multimedia Subsystem server.

12. The communication device according to claim 10, operating as a gateway between an Internet Protocol Multimedia Subsystem and another communication network.

13. The communication device according to claim 1, wherein the indicator includes a transaction identifier parameter.

14. The communication device according to claim 1, wherein the second message is a Session Initiation Protocol message, and the indicator of the first transmission protocol includes a content type indicator.

15. The communication device according to claim 1, wherein the indicator indicates a type of message body that the communication device requests to receive in response to the second message.

16. The communication device according to claim 15, wherein the indicator includes an accept header field.

17. A method for generating a message comprising:
determining a type of an information indicated by a first message, wherein the first message is formed in accordance with a first transmission protocol;

selecting a type of message from a plurality of existing types of messages according to a second transmission protocol based on the determined type of information; and generating a second message of the selected type according to the second transmission protocol indicating the information, wherein the second message includes an indicator of the first transmission protocol, and wherein the indicator of the first transmission protocol includes an event package indicator.

18. The method according to claim 17, wherein the second message is a Session Initiation Protocol message, and the indicator of the first transmission protocol includes a content type indicator.

19. One or more non-transitory computer readable media having instructions thereon that, in response to execution by one or more processing devices of a communication device, cause the communication device to:
determine a type of an information indicated by a first message, wherein the first message is formed in accordance with a first transmission protocol;

select a type of message from a plurality of existing types of messages according to a second transmission protocol based on the determined type of information; and generate a second message of the selected type according to the second transmission protocol indicating the information, wherein the second message includes an indicator of the first transmission protocol, and wherein the indicator of the first transmission protocol includes an event package indicator.

20. The one or more non-transitory computer readable media according to claim 19, wherein the type of information is one of information indicating a request, information indicating a positive response to a request, and information indicating a negative response to a request.

21. The one or more non-transitory computer readable media according to claim 19, wherein the indicator indicates a type of message body that the communication device requests to receive in response to the second message.

22. The one or more non-transitory computer readable media according to claim 21, wherein the indicator includes an accept header field.

23. The one or more non-transitory computer readable media according to claim 19, wherein the second message is a Session Initiation Protocol message, and the indicator of the first transmission protocol includes a content type indicator.

* * * * *